US007742945B2

(12) United States Patent
Rauba et al.

(10) Patent No.: US 7,742,945 B2
(45) Date of Patent: Jun. 22, 2010

(54) METHODS, SYSTEMS AND COMPUTER PRODUCTS TO INCENTIVIZE HIGH SPEED INTERNET ACCESS

(75) Inventors: Rimas Rauba, Roswell, GA (US); Gonzalo Salazar, Alpharetta, GA (US)

(73) Assignee: AT&T Intellectual Property, I,L.P., Reno, NV (US)

( * ) Notice: Subject to any disclaimer, the term of this patent is extended or adjusted under 35 U.S.C. 154(b) by 207 days.

(21) Appl. No.: 11/845,728

(22) Filed: Aug. 27, 2007

(65) Prior Publication Data

US 2009/0059912 A1 Mar. 5, 2009

(51) Int. Cl.
*G06Q 30/00* (2006.01)
(52) U.S. Cl. .................. 705/14.49; 705/14.73; 370/486
(58) Field of Classification Search .................. 370/486
See application file for complete search history.

(56) References Cited

U.S. PATENT DOCUMENTS

| | | | |
|---|---|---|---|
| 4,850,007 A * | 7/1989 | Marino et al. .......... 379/114.13 |
| 5,459,606 A | 10/1995 | Baranyai et al. | |
| 5,513,117 A | 4/1996 | Small | |
| 5,557,320 A | 9/1996 | Krebs | |
| 5,559,877 A | 9/1996 | Ash et al. | |
| 5,847,760 A | 12/1998 | Elmaliach et al. | |
| 5,855,008 A * | 12/1998 | Goldhaber et al. ......... 705/14.1 |
| 6,046,980 A | 4/2000 | Packer | |
| 6,594,265 B1 | 7/2003 | Etorre et al. | |
| 6,931,444 B2 | 8/2005 | Schweitzer | |
| 6,934,745 B2 | 8/2005 | Krautkremer | |
| 6,975,594 B1 | 12/2005 | Byers | |
| 6,976,003 B1 | 12/2005 | Hamor et al. | |
| 7,113,479 B2 | 9/2006 | Wong | |
| 7,124,195 B2 | 10/2006 | Roach et al. | |
| 7,149,892 B2 | 12/2006 | Freed et al. | |
| 7,171,485 B2 | 1/2007 | Roach et al. | |
| 7,383,230 B2 | 6/2008 | Wolff | |
| 7,415,439 B2 | 8/2008 | Kontio et al. | |
| 7,430,187 B2 | 9/2008 | Holt et al. | |
| 7,444,588 B2 | 10/2008 | Hill et al. | |
| 2001/0005837 A1 | 6/2001 | Kojo | |
| 2002/0054059 A1 | 5/2002 | Schneiderman | |
| 2002/0087696 A1 | 7/2002 | Byrnes | |
| 2002/0103895 A1 | 8/2002 | Chiang | |
| 2002/0116488 A1 | 8/2002 | Subramanian et al. | |

(Continued)

OTHER PUBLICATIONS

Chaudry, Abhijit, et al., "Web Channels in E-commerce" Communications of the ACM, Jan. 2001, pp. 99-104 vol. 1 (need publisher and city and/or country where published).

(Continued)

*Primary Examiner*—Huy D Vu
*Assistant Examiner*—Stephen J Clawson
(74) *Attorney, Agent, or Firm*—Cantor Colburn LLP

(57) ABSTRACT

Temporary increased broadband bandwidth services for high speed access and download of Internet websites are provided to end user DSL subscribers by a system and method to increase speed of accessing certain Internet websites to incentivize the end user DSL subscribers to purchase higher speed broadband services and to incentivize content providers to pay for the temporary increased broadband services. The speed category of a customer premises equipment turbo modem is controlled by either a wired or wireless serving center computer processor, based on either the wired or wireless serving center computer processor determining whether to download Internet and video content at a predetermined selected speed category.

20 Claims, 4 Drawing Sheets

U.S. PATENT DOCUMENTS

| | | |
|---|---|---|
| 2002/0178053 A1 | 11/2002 | Eaker et al. |
| 2002/0188732 A1 | 12/2002 | Buckman et al. |
| 2003/0005112 A1 | 1/2003 | Krautkremer |
| 2003/0014462 A1 | 1/2003 | Bennett et al. |
| 2003/0023721 A1 | 1/2003 | Vinberg |
| 2003/0023722 A1 | 1/2003 | Vinberg |
| 2003/0069964 A1 | 4/2003 | Shteyn et al. |
| 2003/0074439 A1 | 4/2003 | Grabarnik et al. |
| 2003/0074445 A1 | 4/2003 | Roach et al. |
| 2003/0074474 A1 | 4/2003 | Roach et al. |
| 2003/0078939 A1 | 4/2003 | Ma |
| 2003/0084145 A1 | 5/2003 | Ramachandran et al. |
| 2003/0084147 A1 | 5/2003 | Gourraud |
| 2003/0084150 A1 | 5/2003 | Hansen et al. |
| 2003/0095135 A1 | 5/2003 | Kaasila et al. |
| 2003/0229720 A1 | 12/2003 | Kiremidjian et al. |
| 2003/0233422 A1 | 12/2003 | Csaszar et al. |
| 2004/0015776 A1 | 1/2004 | Scott |
| 2004/0093513 A1 | 5/2004 | Cantrell et al. |
| 2004/0098302 A1* | 5/2004 | Feeley .................. 705/14 |
| 2004/0111308 A1 | 6/2004 | Yakov |
| 2004/0192324 A1 | 9/2004 | Rudkin |
| 2004/0199604 A1 | 10/2004 | Dobbins et al. |
| 2004/0199667 A1 | 10/2004 | Dobbins |
| 2004/0201752 A1 | 10/2004 | Parulski et al. |
| 2004/0230678 A1 | 11/2004 | Huslak et al. |
| 2004/0230683 A1 | 11/2004 | Adamczyk et al. |
| 2004/0230695 A1 | 11/2004 | Anschutz et al. |
| 2004/0252698 A1 | 12/2004 | Anschutz et al. |
| 2005/0015493 A1 | 1/2005 | Anschutz et al. |
| 2005/0015494 A1 | 1/2005 | Adamczyk et al. |
| 2005/0021716 A1 | 1/2005 | Adamczyk et al. |
| 2005/0021739 A1 | 1/2005 | Carter et al. |
| 2005/0025136 A1 | 2/2005 | Anschutz et al. |
| 2006/0020525 A1 | 1/2006 | Borelli et al. |
| 2006/0025219 A1 | 2/2006 | Nassef et al. |
| 2006/0031770 A1 | 2/2006 | McMenamin |
| 2006/0208074 A1 | 9/2006 | Eglen et al. |
| 2007/0100981 A1 | 5/2007 | Adamczyk et al. |
| 2007/0112956 A1 | 5/2007 | Chapman et al. |

OTHER PUBLICATIONS

Battarbee, Katja, : Recording Experience Through Images: Defining Co-Experience Proceedings of the 2003 International Conference on Designing Pleasurable Products and Interfaces, Jun. 2003, pp. 109-113, DPPI '03.

BellSouth Teams with MyWay.com to Launch Next Generation Internet Portal Dec. 8, 1999, business wire. http://www.findarticles.com/p/articles/ml_MOEIN/is_1999-Dec-8/ai_58086123.

Blake et al., "An architecture for Differentiated Services," The Internet Society Dec. 1998.

DSL Forum, DSL Evolution-Architecture Requirements for the support of QoS-Enabled IP Services, Proposed Draft: PD-00X-081, Aug. 2002, Revision 1.

DSL Forum, DSL Evolution-Architecture Requirements for the support of QoS-Enabled IP Services, Working Text: WT-081, Dec. 2002, Revision 4.

DSL Forum, DSL Evolution-Architecture Requirements for the support of QoS-Enabled IP Services, Working Text: WT-081, Feb. 2003, Revision 5.

DSL Forum, DSL Evolution-Architecture Requirements for the support of QoS-Enabled IP Services, Working Text: WT-081, Mar. 2003, Revision 6.

DSL Forum, DSL Evolution-Architecture Requirements for the support of QoS-Enabled IP Services, Working Text: WT-081, Mar. 2003, Straw Ballot Revision 7.

DSL Forum, DSL Evolution-Architecture Requirements for the support of QoS-Enabled IP Services, Working Text: WT-081, Mar. 2003, Straw Ballot Revision 8.

DSL Forum, DSL Evolution-Architecture Requirements for the support of QoS-Enabled IP Services, Working Text: WT-081, Jun. 2003, Letter Ballot Revision 9.

Anschutz et al., DSL Forum, DSL Evolution-Architecture Requirements for the support of QoS-Enabled IP Services, Technical Report: TR-059, Sep. 2003.

About the DSL Forum Who We Are: Staff Retrieved from the Internet Aug. 3, 2007 at URL http://www.dslforum.org/about/staff.shtml.

About the DSL Forum Who We Are: Staff [Retrieved from the Internet Aug. 3, 2007 at URL] http://www.dslforum.org/about/staff.shtml.

* cited by examiner

METHODS, SYSTEMS AND COMPUTER PRODUCTS TO INCENTIVIZE HIGH SPEED INTERNET ACCESS

RELATED APPLICATIONS

The present invention is related to the following U.S. patent applications: Ser. No. 10/719,471 (now patent application publication US 2004/0230678); Ser. No. 10/737,558 (patent application publication US 2005/0021739); Ser. No. 10/756,790 (patent application publication US 2004/0252698); and Ser. No. 10/911,864 (patent application publication US 2006/0031770). Each of the afore mentioned related U.S. patent applications and their associated U.S. patent application publications contain, in their entirety, essential material concerning wireless and/or wireline (including digital subscriber line) high speed access and download of content. Thus, the afore mentioned related U.S. patent applications and associated U.S. patent application publications are herein incorporated by reference in their entirety.

FIELD OF THE INVENTION

The present invention relates generally to broadband telecommunications service, and more particularly, to high speed access and download of Internet websites.

BACKGROUND

Generally, end user broadband subscribers using their home and/or business computers to access Internet websites and content have unpleasant experiences trying to access Internet websites and content. Numerous low-speed (i.e., 256 kbs and 1.5 kbs) digital subscriber line (DSL) users experience long access times when accessing Internet websites and content. These DSL users would benefit from "temporarily" accessing certain Internet websites and content at much higher download speeds. As an example, a customer/subscriber can be provided the ability to quickly download and view a short (data intensive) video instantaneously when clicking on certain advertisements on sites such as GOOGLE™, YAHOO!® or other product, service and content provider's websites.

Furthermore, the end user home and business DSL customers/subscribers pay the broadband service provider and do not receive any price offset for the slow access capability. In addition, the end user DSL customers/subscribers would have to pay the broadband service provider more, in order to obtain faster broadband service. Also, Internet applications are becoming more bandwidth demanding, thus increasing the frustrations of end user DSL customers/subscribers with slower and slower Internet website access times.

Therefore, the need exists for a system and method for providing end user DSL customers/subscribers a service for temporarily accessing certain Internet websites and content at much higher download speeds. Higher speed access would provide the end user customers/subscribers a more pleasant customer experience.

Furthermore, the need exists for a system and method of offsetting the cost to the end user subscriber for faster Internet website access. Combined with the faster access times, a reduction in cost would provide the end user customers/subscribers with a good customer viewing experience; and the good customer experience would be an incentive for the end user customers/subscribers to purchase faster broadband service capabilities from the broadband service provider.

BRIEF SUMMARY

Exemplary embodiments include methods and systems for providing a broadband service to a customer from a broadband provider using wireline and/or wireless technology for downloading Internet websites and video content. When a customer subscribes to Internet access service, from a broadband service provider, the customer will be provided, by the broadband service provider, customer premises equipment (CPE) in the form of a high speed data access device. This high speed data access device can be any one of a wireline or wireless access device and is referred to herein interchangeably as a CPE turbo modem, turbo modem and modem. The speed category of the turbo modem is controlled by a serving wireline and/or wireless center computer processor, based on the serving wireline and/or wireless center computer processor determining whether to either download Internet and video content at a predetermined selected speed category or whether to download a predetermined content at a designated speed category, where the predetermined selected speed and the designated speed categories are offered to the customer as high speed services which improve the service experience of the customer. Subsequently, this temporary high speed promotional service is ended. In exchange for the improved service experience that the customer/user receives, i.e., where the customer/user is exposed to an advertisement from a company or an associated entity sponsoring a speed boost, the customer/user is invited to contract with the broadband service provider to receive permanent high speed service or the customer/user may receive other compensation options. Therefore, the customer/user receives an improved service experience and the improvement is sponsored and paid for and/or offset by the content provider.

These embodiments result in customers/subscribers obtaining a temporary higher broadband access service without paying for it. The Internet website product content service provider gets additional interest from end user customers/subscribers by providing an incentive (e.g., free increased download speed), if the customer/user visits the content service provider's website and the broadband service provider achieves continued revenue by selling high speed broadband service to the customer/user, as well as receiving click through fees and additional compensation from the content providers who sponsor and contribute to the cost of the temporary high speed promotional service, as payment for the additional interest from the customer/user in the content providers' websites, where the increased download speed can be a predetermined temporary increase of a designated download speed.

Other systems, methods, and/or computer program products according to embodiments will be or become apparent to one with skill in the art upon review of the following drawings and detailed description. It is intended that all such additional systems, methods, and/or computer program products included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments disclosed herein illustrate a communications service incentive, where the communications service incentive includes a temporary turbo high speed broadband service incentive offered by a broadband service provider. The disclosed exemplary embodiments are intended to be illustrative only, since numerous modifications and variations therein will be apparent to those of ordinary skill in the art. In reference to the drawings, like numbers will indicate like parts continuously throughout the view. Further, the terms "a", "an", "first", "second", "third" and "fourth" herein do not denote limitations of quantity, but rather denote the presence of one or more of the referenced item(s).

In the exemplary embodiments, Internet content service providers sponsor and/or pay for the temporary turbo high speed broadband service incentive in exchange for additional interest from end user subscribers/customers. When a subscriber/customer wishes to use a subscriber device to access Internet content, the subscriber/customer would prefer to access the Internet content at the highest access speeds possible, so as to have an improved experience of enjoying the desired Internet content. In addition, the subscribers/customers dislike paying higher monthly recurring Internet access charges to obtain an improved viewing experience. In addition, the incentive is provided to motivate the customer/subscriber to purchase high speed broadband service to be delivered over a digital subscriber line (DSL). Therefore, the exemplary embodiments herein disclose methods, systems and computer products that incentivize Internet content service providers to pay for and/or offset the cost of the improved Internet access experience of subscribers/customers, thus keeping the monthly recurring costs to the subscriber/customer relatively low and also provide the opportunity to upsell high speed Internet access products to end user subscribers/customers.

Figure 1:
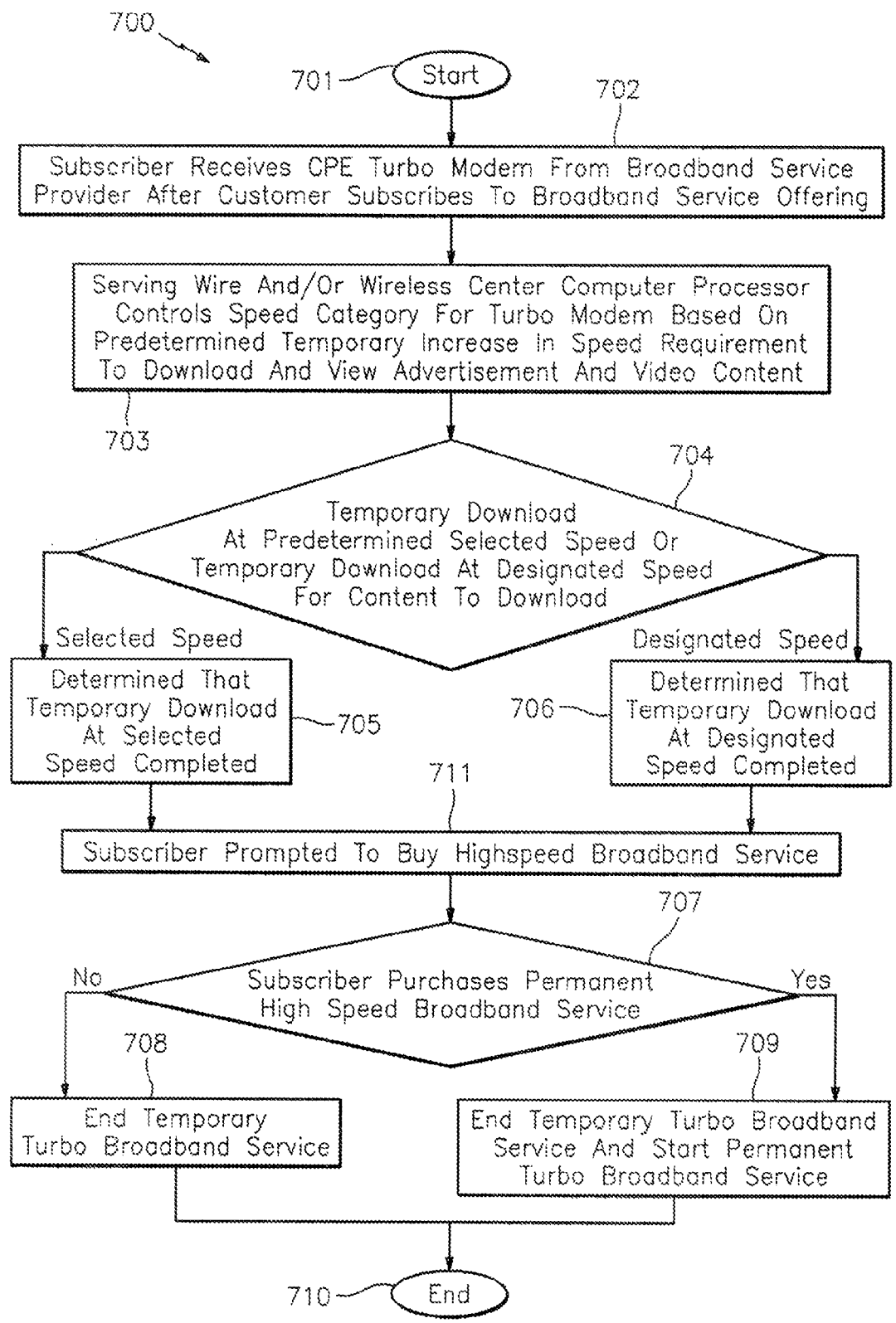
FIG. 1 is an illustration of one exemplary embodiment of a method for providing a temporary broadband service incentive.
Figure 3:
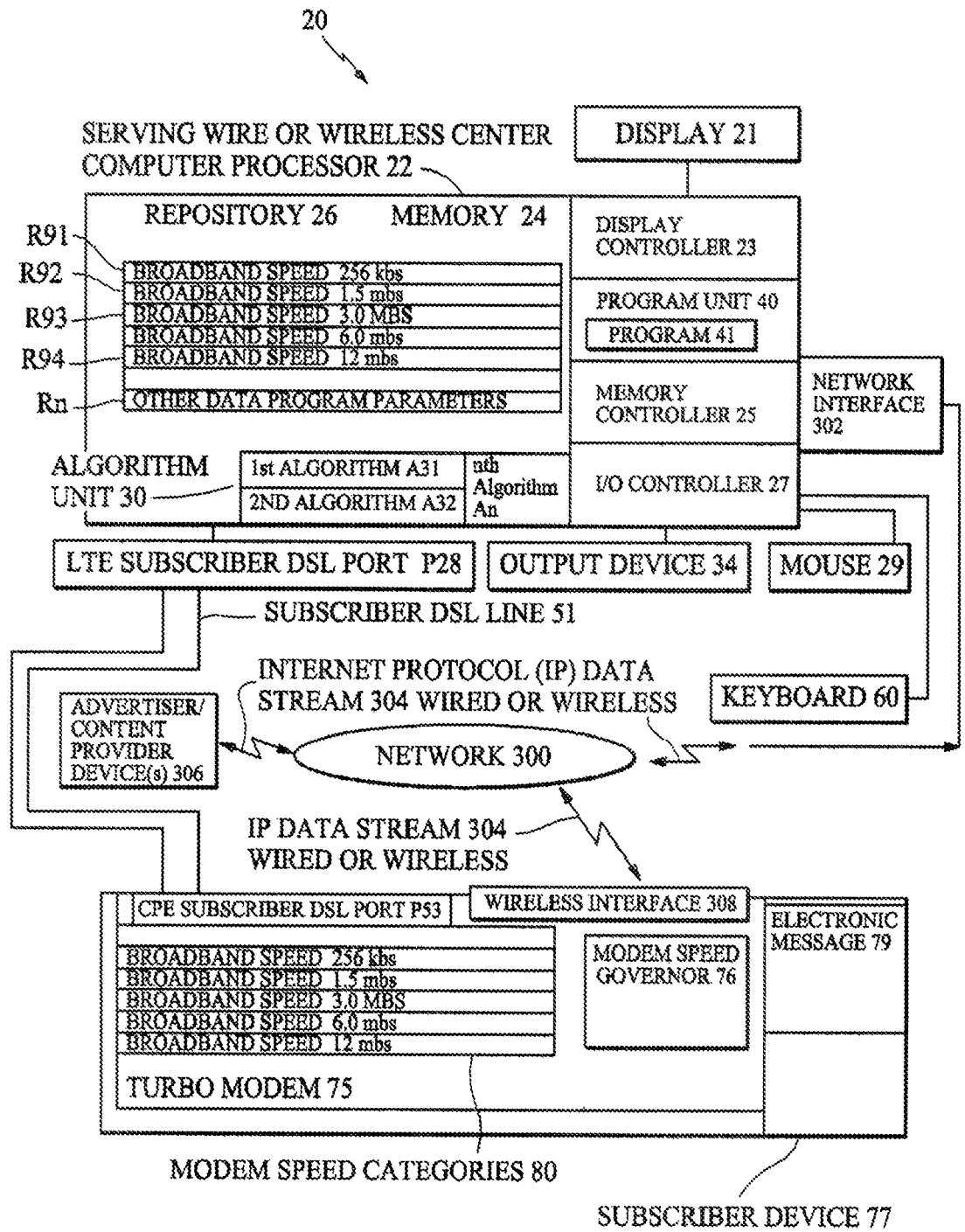
FIG. 3 is an illustration of a system upon which the first and second embodiments of the method for providing a temporary broadband service incentive can be implemented.

Referring to FIG. 1 and FIG. 3, a first exemplary embodiment of providing a temporary turbo broadband service incentive method 700 (herein referred to as the "method 700") and a temporary turbo broadband service incentive computer system 20 (herein referred to as the "system 20") are illustrated. According to exemplary embodiments, the temporary broadband service incentive is offered by a broadband service provider to a subscriber/customer. Also, in the exemplary embodiments, the Internet content provider is incentivized to provide and pay for and/or offset the cost of advertisement and other content with high speed capacity. One arrangement for the Internet content provider to pay for the cost of the high speed download of content would be to make advanced agreements to compensate the broadband service provider with click through fees. Another exemplary arrangement for the Internet content provider to pay for the cost of the high speed download of content would be to offset the cost of Internet access service to the end user/customer by giving the end user/customer credit for future high speed downloads of content.

Figure 2A:
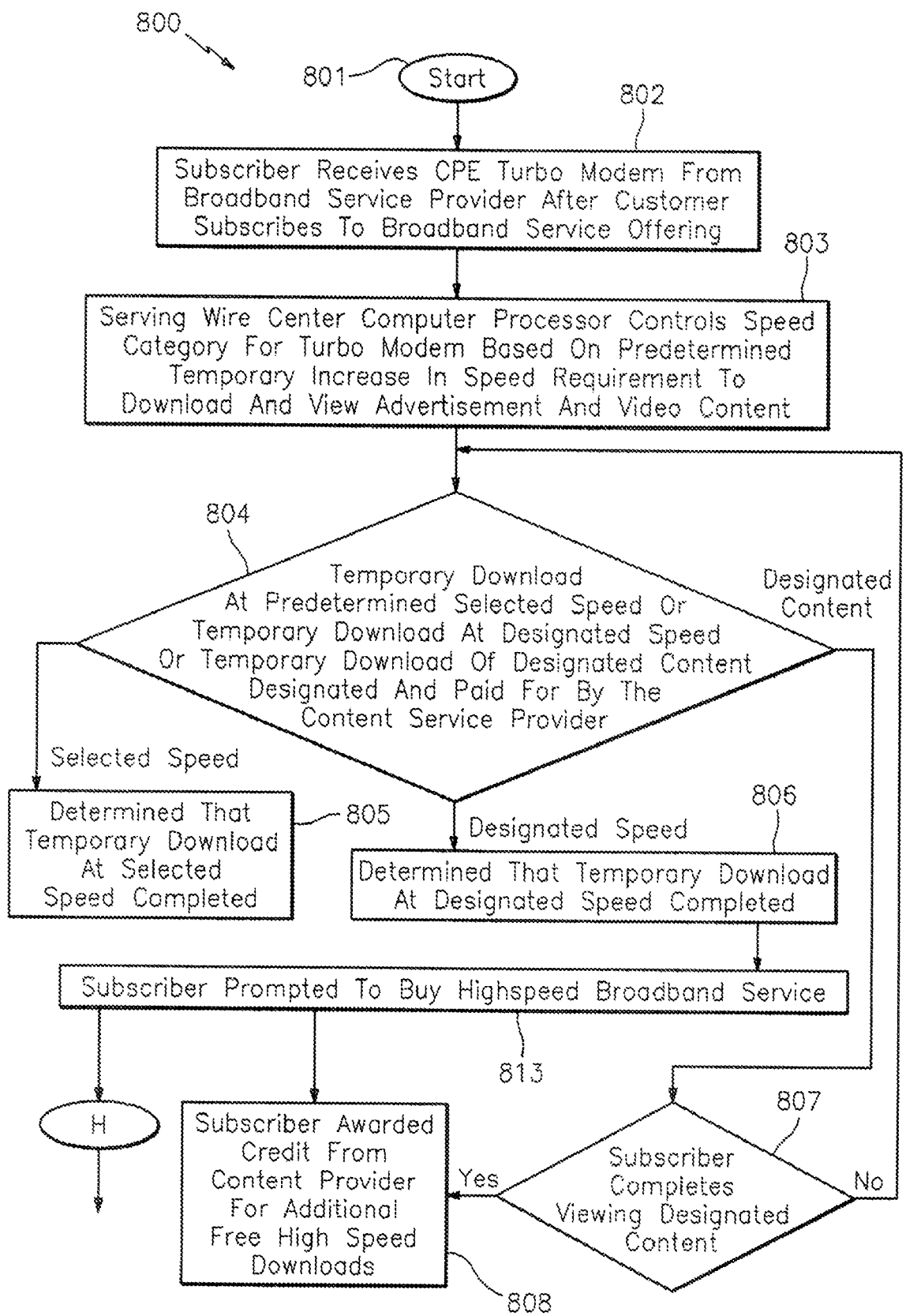
FIG. 2A is an illustration of the initial stages of a second exemplary embodiment for a method of providing a temporary broadband service incentive, where a customer/subscriber views designated content.
Figure 2B:
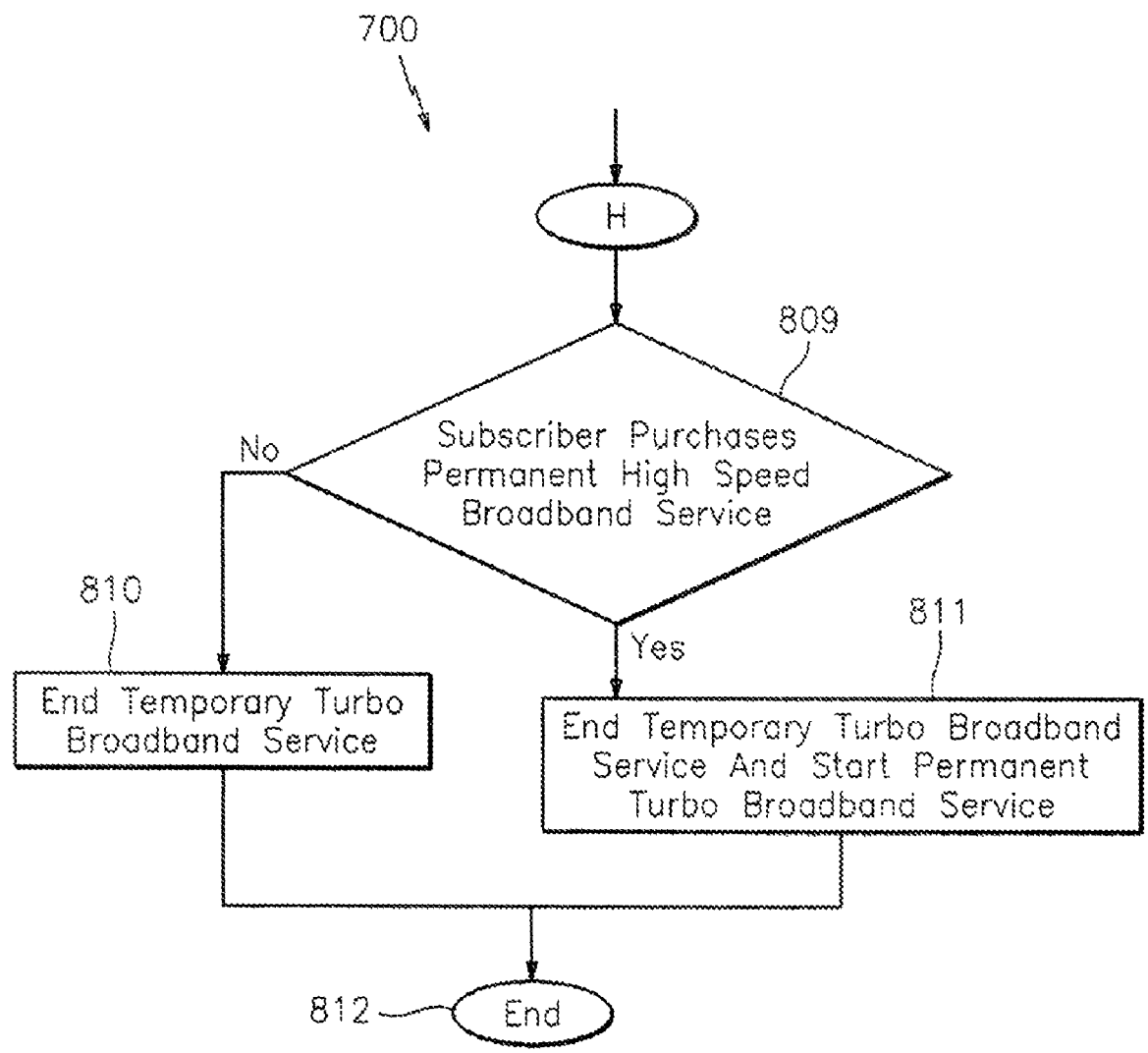
FIG. 2B is an illustration of the final stages of the second exemplary embodiment of a method for providing temporary broadband service incentives.

Referring to FIG. 2A, FIG. 2B and FIG. 3, an exemplary embodiment of providing a temporary turbo broadband service incentive method 800 (herein referred to as the "method 800") along with the system 20 are illustrated. In the exemplary embodiment, the temporary broadband service incentive is also offered by a broadband service provider to a subscriber.

FIG. 3 illustrates the system 20, which is composed of a serving wire and/or wireless center computer processor 22 and a subscriber device 77. Residing in the serving wire and/or wireless center computer processor 22 are a memory 24 and a combination of controller units including a display controller 23, a memory controller 25 and an I/O controller 27. A combination of computer peripheral devices may be connected to the serving wire and/or wireless center computer processor 22 including a display 21, an output device 34, a mouse 29 and a keyboard 60. Also, residing in the serving wire and/or wireless center computer processor 22 are an algorithm unit 30 and a program unit 40. The program unit 40 contains a program 41, which is an article of manufacture composed of computer executable media upon which is stored a program product listing of computer executable program code. When the computer executable program code of the program 41 is executed by the serving wire and/or wireless center computer processor 22, the executed code causes the serving wire and/or wireless center computer processor 22 to perform the operations of providing the temporary turbo broadband service incentive methods 700 and 800 to the subscriber and the content providers respectively, according to exemplary embodiments. In addition, the algorithm unit 30 resides in the serving wire and/or wireless center computer processor 22. The algorithm unit 30 may contain a plurality of algorithms including a first algorithm A31, a second algorithm A32 up to an nth algorithm An. A repository 26 also resides in the memory 24 and contains a plurality of repository entry locations R91, R92, R93 and R94 up to Rn, where the repository entry location Rn represents other data program parameters. According to exemplary embodiments, the plurality of repository entry locations R91 through R94 contain predefined broadband speed categories that are associated with downloading Internet website advertisement content including video and audio content from content providers. The repository 26 contains other repository entry locations that can store other data including program parameters Rn used by the program 41. These other data program parameters Rn can include indicators and control data transmitted from Internet website advertiser's and/or product service content provider's websites via data streams over a network.

Further, FIG. 3 illustrates a network composed of a plurality of advertiser content provider devices 306 cooperatively coupled to the serving wire and/or wireless center computer processor 22 over a network 300, such as the Internet, via a network interface 302 which is cooperatively coupled to the serving wire and/or wireless center computer processor 22. According to exemplary embodiments, the advertiser content provider devices 306 may transmit other data program parameters, such as content speed indicators via an Internet Protocol (IP) data stream 304 to the serving wire and/or wireless center computer processor 22 to be used by the program 41 to increase and/or terminate the download speed of the content downloaded to a subscriber device 77.

Referring to FIG. 3, the subscriber device 77, i.e., also interchangeably referred to herein as the user and/or the customer system can be cooperatively coupled to the serving wire and/or wireless center computer processor 22 by way of a customer premises equipment (CPE) subscriber DSL port P53 over a subscriber DSL line 51, which is connected to a line termination, (LTE) subscriber DSL port P28. The LTE subscriber DSL port P28 resides in the serving wire and/or wireless center computer processor 22, according to exemplary embodiments. The subscriber device 77 can also be cooperatively coupled wirelessly to the serving wire and/or wireless center computer processor 22 via the network 300. The subscriber device 77 can be one or more wired or wireless and/or mobile computer implemented communication devices, including a personal digital assistant, a cell phone based device or a computer terminal, laptop, desktop, handheld or workstation. The subscriber device 77 may contain a customer premises equipment turbo modem 75 (herein referred to as turbo modem 75). Residing in the turbo modem 75 is a modem speed governor 76. The turbo modem 75 may have a plurality of modem speed categories 80 ranging from 256 kbs, 1.5 mbs, 3.0 mbs 6.0 mbs up to 12 mbs. The speed range of the plurality of modem speed categories 80 can be greater or smaller depending on the state of available modem technology. Thus, the turbo modem 75 speed categories 80 can range from between about 256 kbs to about 12 mbs.

Referring to FIG. 1 and FIG. 3, the first exemplary embodiment, i.e., the method 700 is initiated at operation start 701. After the customer/subscriber has subscribed to the temporary turbo broadband service incentive program, the broadband service provider provides the customer/subscriber with the turbo modem 75 at operation 702. The turbo modem 75 is capable of the fastest turbo download speeds currently available for example, 12 million bits per second (12 mbs). The turbo modem 75 is equipped with the modem speed governor 76, based on the actual broadband service that the end user subscribes to (e.g., 256 kbs, 1.5 mbs, 3.0 mbs, 6.0 mbs or 12 mbs). The broadband service provider and an Internet content provider, such as an Internet website advertiser and/or product service content provider negotiate an agreements as to the speed category at which content provided by the content provider can be accessed. When the agreements have been reached as to the price per click-through, that the content provider pays the broadband service provider, then the broadband service provider temporarily increases the speed available to the subscriber device 77 for downloading and viewing the content associated with the Internet content provider at the selected speed category agreed to between the broadband service provider and the Internet content provider at operation 704. In exemplary embodiments, the content, such as an advertisement, itself can automatically be positioned as available at a designated set speed at operation 704. Thus, when the advertisement (i.e., "ad") is created, an indicator may be associated with the IP data stream 304 of the advertisement such that when the advertisement is accessed, the indictor in the IP data stream 304 triggers the serving wire and/or wireless center computer processor 22 of the broadband service provider to transmit at the predetermined temporary, designated (i.e., increased) download speed. Further, the modem speed governor 76 acknowledges the designated download speed and causes the turbo modem 75 to operate at the appropriate speed category in receiving the download content. After the serving wire and/or wireless center computer processor 22 determines through one or more completing operations that either the temporary download at the selected speed is completed at operation 705 or the temporary download at the designated speed is completed at operation 706, then at operation 711, the program 41 calls an algorithm that causes the serving wire and/or wireless center computer processor 22 to prompt the customer/subscriber, where the prompting is carried out through the subscriber device 77, to purchase a high speed broadband communications service from the broadband service provider. At operation 707, the serving wire and/or wireless center computer processor 22 determines whether or not the customer/subscriber purchases permanent high speed broadband service from the broadband service provider. If the customer/subscriber does not purchase the high speed broadband service (NO), then at operation 708, the temporary turbo broadband service is ended by the serving wire and/or wireless center computer processor 22. In the exemplary embodiments if the customer/subscriber does purchase the high speed broadband service (YES), then the temporary broadband service is ended after the high speed service is delivered to the customer/subscriber. After either operation 708 or operation 709, the method 700 proceeds to end at operation 710.

Referring to FIGS. 2A, 2B and 3, a second exemplary embodiment includes giving the customer/subscriber a limited amount of high speed capability once the customer/subscriber has accessed certain content, such as accessing and viewing an advertisement in the advertisement's entirety. For example, if a customer/subscriber accesses an advertisement for a FORD EXPLORER, the subscriber may earn an amount of time at which the subscriber can access content at a higher access speed than what the customer/subscriber subscribes. The customer/subscriber may be provided a visual representation of a "high speed account" with minutes of the higher download speed earned from accessing certain content when the customer/subscriber accesses the high speed broadband service provider's broadband homepage. For example, the "high speed account" indicates that a customer/subscriber has earned 10 minutes of 3 mbs access/download speed to be used at the customer's/subscriber's discretion to surf the Internet. Thus, a customer/subscriber who wants higher broadband access (without paying for it) can build up time if the customer/subscriber is willing to view multiple advertisements or visit certain websites. The product content provider gets additional interest from end users by providing an incentive (free increased download speed), if the end users visit the content provider's site and the end users obtain higher speed without paying for it, where the cost of the high speed access is offset by the product content provider, based on a predetermined agreement between the product content provider and the broadband service provider. According to exemplary embodiments, in addition to customers/subscribers earning higher speed access credits for accessing certain content, the customers/subscribers can also pay for a predetermined amount of higher speed access or a predetermined number of downloads with higher speed access per month in conjunction with a normal service plan purchased by the customers/subscribers from their broadband service provider.

Referring to FIG. 2A and FIG. 3, the method 800 is initiated at operation start 801, in accordance with a second exemplary embodiment. After the customer/subscriber has subscribed to the temporary turbo broadband service incentive program, the broadband service provider provides the customer/subscriber with a customer premises equipment turbo modem, such as the turbo modem 75 at operation 802. The turbo modem 75 is capable of the fastest download speeds currently available for example, 12 million bits per second (12 mbs). The turbo modem 75 is equipped with a modem speed governor 76, based on the actual broadband service that the end user subscribes to (i.e., 256 kbs, 1.5 mbs, 3.0 mbs, 6.0 mbs or 12 mbs). The broadband service provider and the Internet website advertiser and/or product service content provider negotiate an agreement as to the speed category for the content of the Internet website advertiser and/or product service content provider's website content. When an agreement has been reached as to the price per click-through, that the product content provider pays the broadband service provider for an increase in the download speed available to the subscriber, then the broadband service provider temporarily increases the speed available to the subscriber device 77 for downloading and viewing the advertisement/video content at a selected speed category agreed to between the broadband service provider and an Internet website advertiser and/or product service content provider at operation 804. In exemplary embodiments, the advertisement itself can automatically be positioned as available at a designated set speed at operation 804. Further, in the exemplary embodiments, a designated advertisement content is downloaded at an agreed upon high speed (i.e., agreed upon by the broadband service provider and the content provider); for example, when the ad is created, an indicator in the IP data stream 304, triggers the service serving wire and/or wireless center computer processor 22 of the broadband service provider to transmit at the proper download speed. Therefore, the content at a predetermined selected speed category, the predetermined content at a designated speed category and the designated content category are offered to a customer as a set of high speed services composing a temporary turbo high speed broadband service. Further, the modem speed governor 76 acknowledges the download speed and causes the turbo modem 75 to operate at the appropriate speed category in receiving the download content. After the serving wire and/or wireless center computer processor 22 determines that either the temporary high speed download at the selected speed is completed at operation 805, or the temporary high speed download at the designated speed is completed at operation 806, then the method 800 continues at H, where the serving wire and/or wireless center computer processor 22 determines whether or not the customer/subscriber purchases permanent high speed broadband service at operation 809. In exemplary embodiments, if the customer/subscriber completes viewing any designated content category of temporary high speed downloads at operation 807, then at operation 808, the customer/subscriber is, for each completed viewing, awarded credit, i.e., earned extra high speed minutes of viewing time towards additional high speed downloads to be used at the customer's/subscriber's discretion. When it is determined by the serving wire and/or wireless center computer processor 22 that the customer/subscriber has completed viewing any designated content, then the program 41 calls another algorithm which temporarily records the amount of earned extra high speed minutes in the repository 26, as the other data program parameters Rn. In addition to recording the earned extra high speed minutes in the repository 26, the program 41 also causes the serving wire and/or wireless center computer processor 22 to send an electronic message 79 to the subscriber device 77 that notifies the subscriber of an amount of earned high speed minutes available for the subscriber to access via the subscriber device 77 for surfing the Internet. Then, the program 41 keeps track of the amount of earned high speed minutes in the repository 26 that the subscriber uses for surfing the Internet and the content provider is charged by the broadband service provider for the earned high speed minutes.

At operation 813, the program 41 calls another algorithm that prompts the customer/subscriber through the subscriber device 77 to purchase high speed broadband service from the broadband service provider. At operation 809, if the serving wire and/or wireless center computer processor 22 determines that the customer/subscriber does not purchase the high speed broadband service (NO), then at operation 810, the temporary turbo broadband service is ended by the serving wire and/or wireless center computer processor 22. Further, in the exemplary embodiments, if the serving wire and/or wireless center computer processor 22 determines that the customer/subscriber does purchase the high speed broadband service (YES), then the temporary broadband service is ended after the high speed service is delivered to the customer/subscriber. After either operation 810 or operation 811, the method 800 proceeds to end operation 812.

As described above, the exemplary embodiments can be in the form of computer-implemented processes and systems for practicing those processes. The exemplary embodiments can also be in the form of computer program code containing instructions embodied in tangible media, such as floppy diskettes, CDROMs, hard drives, or any other computer-readable storage medium, wherein, when the computer program code is loaded into and executed by a computer, the computer becomes a system for practicing the exemplary embodiments. The exemplary embodiments can also be in the form of computer program code, for example, stored in a storage medium, or loaded into and/or executed by a computer, wherein, when the computer program code is loaded into and executed by a computer, the computer becomes a system for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing a communications service incentive by a service center having a computer, the method comprising:

controlling by a computer a speed category of a turbo modem operative to connect to customer equipment, wherein the computer causes a turbo modem speed governor to operate the turbo modem at different speeds;

determining by the computer one of whether to download a content at a predetermined selected speed category and whether to download a predetermined content at a designated speed category, wherein the predetermined selected speed category and the designated speed category are offered to a customer as a high speed service to incentivize the customer to purchase a permanent high speed broadband service;

determining by the computer that downloading from a content provider is complete;

in response to the service provider receiving an indication from the content provider and in response to the content provider paying for high speed minutes, providing by the computer the high speed minutes to the customer when the downloading is complete;

wherein the high speed minutes are for high speed service of the service provider; and storing an amount of the high speed minutes, wherein the amount of high speed minutes increases with subsequent downloading from the content provider;

prompting by the computer the customer to purchase the permanent high speed broadband service;

determining by the computer whether the customer purchases the permanent high speed broadband service; and ending by the computer the high speed service.

2. The method according to claim 1, wherein the high speed service is a temporary turbo high speed broadband service, wherein controlling the speed category of the turbo modem is based on a predetermined temporary increase in the predetermined selected speed category to download and view the content, and wherein one of a serving wire center computer processor and a serving wireless center computer processor controls the speed category of the turbo modem.

3. The method according to claim 2, wherein determining that downloading is complete includes one of completing, in a first completing operation, downloading of the content at the predetermined selected speed category, if it is determined by one of the serving wire center computer processor and the serving wireless center computer processor to download the content at the predetermined selected speed category and completing, in a second completing operation, downloading the predetermined content at the designated speed category, if it is determined by one of the serving wire center computer processor and the serving wireless center computer processor to download the predetermined content at the designated speed category.

4. The method according to claim 3, wherein determining that downloading is complete further includes determining whether the customer completes viewing the predetermined content at the designated speed category.

5. The method according to claim 1, wherein prompting the customer to purchase the permanent high speed broadband service is initiated by one of a serving wire center computer processor and a serving wireless center computer processor and carried out by a subscriber device;

further comprising notifying the customer of the amount of high speed minutes that are available for accessing the Internet.

6. The method according to claim 2, wherein ending the temporary turbo high speed broadband service includes one of ending the temporary turbo high speed broadband service, if the customer does not purchase the permanent high speed broadband service and ending the temporary turbo high speed broadband service, after the customer purchases the permanent high speed broadband service.

7. A program product stored as a listing of computer executable program code on a computer readable medium for providing a communications service, when executed by a processor, the listing of computer executable program code causes the processor to perform a method comprising:

controlling a speed category for a turbo modem operative to connect to customer equipment, wherein the computer causes a turbo modem speed governor to operate the turbo modem at different speeds;

determining one of whether to download a content at a predetermined selected speed category and whether to download a predetermined content at a designated speed category, wherein the predetermined selected speed category and the designated speed category are offered to a customer as a high speed service to incentivize the customer to purchase a high speed broadband service;

determining that downloading from the content provider is complete;

in response to the service provider receiving an indication from the content provider and in response to the content provider paying for high speed minutes, providing the high speed minutes to the customer when the downloading is complete;

wherein the high speed minutes are for high speed service of the service provider;

storing an amount of the high speed minutes, wherein the amount of high speed minutes increases with subsequent downloading from the content provider;

prompting the customer to purchase the high speed broadband service;

determining whether the customer purchases the high speed broadband service; and ending the high speed service.

8. The program product according to claim 7, wherein controlling the speed category of the turbo modem is based on a predetermined temporary increase in the predetermined selected speed category to download and view advertisements and video content.

9. The program product according to claim 8, wherein determining that downloading is complete includes one of completing, in a first completing operation, downloading of the content at the predetermined selected speed category, if it is determined by one of the serving wire center computer processor and the serving wireless center computer processor to download the content at the predetermined selected speed category and completing, in a second completing operation, downloading of the predetermined content at the designated speed category, if it is determined by one of the serving wire center computer processor and the serving wireless center computer processor to download the predetermined content at the designated speed category, and completing in a third completing operation, downloading of a designated content if it is determined by one of the serving wire center computer processor and the serving wireless center computer processor that the customer has completed viewing the designated content.

10. The program product according to claim 9, further comprising determining by one of the serving wire center computer processor and the serving wireless center computer processor that the customer is awarded credit from a content service provider for additional free high speed downloads, when the customer completes viewing the designated content.

11. The program product according to claim 10, wherein the high speed service is a temporary turbo high speed broadband service.

12. The program product according to claim 11, wherein prompting the customer to purchase the high speed broadband service is initiated by one of the serving wire center computer processor and the serving wireless center computer processor.

13. The program product according to claim 12, wherein the temporary turbo high speed broadband service is ended by one of the serving wire center computer processor and the serving wireless center computer processor after one of the customer does not purchase the high speed broadband service and the customer purchases the high speed broadband service.

14. A system for providing communications service incentives, the system comprising:

a turbo broadband service incentive computer system including a subscriber device and one of a serving wire center computer processor and a serving wireless center computer processor, wherein the subscriber device contains a turbo modem comprising a turbo modem speed governor to operate the turbo modem at different speeds, and wherein the serving wire center computer processor and the serving wireless center computer processor contain a computer executable program that when executed by one of the serving wire center computer processor and the serving wireless center computer processor, causes the turbo broadband service incentive computer system to:

control a speed category for the turbo modem;

determine one of whether to download a content at a predetermined selected speed and whether to download a predetermined content at a designated speed and whether to download a designated content, designated by a content service provider at a high speed, wherein the predetermined selected speed, the designated speed, and the designated content are offered to a customer as a set of high speed services to incentivize the customer to purchase a high speed broadband service by improving the customer's viewing experience, and wherein the content service provider is incentivized to pay for high speed download because of increased interest in the content service provider's content;

determine whether the customer completes viewing the predetermined content at the designated speed category;

determine that downloading of any content from the content provider is complete;

in response to the service provider receiving an indication from the content provider and in response to the content provider paying for high speed minutes, provide the high speed minutes to the customer when the downloading is complete;

wherein the high speed minutes are for high speed service of the service provider;

store an amount of the high speed minutes, wherein the amount of high speed minutes increases with subsequent downloading from the content provider;

prompt the customer to purchase a permanent high speed broadband service;

determine whether the customer purchases the permanent high speed broadband service; and end the set of high speed services.

15. The system according to claim 14, wherein control of the speed category of the turbo modem is based on a predetermined temporary increase in the predetermined selected speed to download and view advertisements and video content, and wherein the turbo modem is provided to the customer by a broadband service provider.

16. The system according to claim 15, wherein downloading of any content is completed by one of completing, in a first completing operation, downloading of the content at the predetermined selected speed category, if it is determined by one of the serving wire center computer processor and the serving wireless center computer processor to download the content at the predetermined selected speed category and completing, in a second completing operation, downloading of the predetermined content at the designated speed category, if it is determined by one of the serving wire center computer processor and the serving wireless center computer processor to download the predetermined content at the designated speed category, and completing in a third completing operation, downloading of the designated content if it is determined by one of the serving wire center computer processor and the serving wireless center computer processor that the customer has completed viewing the designated content.

17. The system according to claim 16, wherein one of the serving wire center computer processor and the serving wireless center computer processor determines that the customer is awarded credit for additional free high speed downloads, when the customer has completed viewing the designated content.

18. The system according to claim 17, wherein the set of high speed services compose a temporary turbo high speed broadband service.

19. The system according to claim 18, wherein prompting the customer to purchase the permanent high speed broadband service is initiated by one of the serving wire center computer processor and the serving wireless center computer processor.

20. The system according to claim 19, wherein the temporary turbo high speed broadband service is ended after one of the customer does not purchase the permanent high speed broadband service and the customer purchases the permanent high speed broadband service.

* * * * *